United States Patent [19]

Siby

[11] Patent Number: 4,506,556
[45] Date of Patent: Mar. 26, 1985

[54] PRESSURE-COMPENSATING DEVICE IN LOAD CELLS

[75] Inventor: Sture Siby, Västerås, Sweden

[73] Assignee: ASEA Aktiebolag, Västerås, Sweden

[21] Appl. No.: 508,508

[22] Filed: Jun. 28, 1983

[30] Foreign Application Priority Data

Jul. 1, 1982 [SE] Sweden .................. 8204072

[51] Int. Cl.³ .................. G01D 3/04; G01L 1/26
[52] U.S. Cl. .................. 73/862.63; 74/18.2
[58] Field of Search .......... 73/862.38, 862.62–862.66, 73/708; 74/18.2

[56] References Cited

U.S. PATENT DOCUMENTS 3,097,536  7/1963  Young ..................... 73/862.63 X
3,168,826  2/1965  Paetow .................... 73/862.63

Primary Examiner—Charles A. Ruehl
Attorney, Agent, or Firm—Watson, Cole, Grindle & Watson

[57] ABSTRACT

Compensation for external and internal pressure variations in hermetically closed load cells is achieved using three parallel diaphragms vacuum-tightly attached between a force-transmitting member and a surrounding housing. An internal diaphragm is located adjacent the transducer space, a preferably equally large external diaphragm is located adjacent the atmospheric pressure, and an intermediate diaphragm is located therebetween, the intermediate diaphragm being considerably larger than the other two diaphragms. The space between the external diaphragm and the intermediate diaphragm is connected to the transducer space and the space between the internal diaphragm and the intermediate diaphragm is connected to the atmospheric pressure. Any difference between the pressure in the transducer space and the atmospheric pressure will cause forces with the same direction for the internal diaphragm and the external diaphragm but with the opposite direction for the intermediate diaphragm, and with a suitable area of the latter, therefore, an equilibrium of forces can be achieved independently of the pressure variations.

7 Claims, 3 Drawing Figures

PRESSURE-COMPENSATING DEVICE IN LOAD CELLS

TECHNICAL FIELD

The present invention relates to a device for use with a hermetically sealed load cell for eliminating the effect of changes in atmospheric pressure and/or changes of the pressure inside the load cell caused by temperature changes.

BRIEF DISCUSSION OF PRIOR ART

It has been known to solve the above-mentioned problem by connecting a force-measuring or force-transmitting element of the load cell to the surrounding load cell housing with equally large diaphragms at the top and bottom, thus achieving equilibrium of forces. See, for example, U.S. Pat. Nos. 3,168,826 and 3,303,450. The disadvantage of this solution is that the lower diaphragm is situated in an exposed position when the load cell is being used for example in a humid environment (e.g. in a cavity below a track for car weighing), and the air channels to this diaphragm can thus become clogged, thereby affecting the accuracy of the compensation or of putting it out of operation completely.

BRIEF SUMMARY OF THE INVENTION

The present invention seeks to avoid the above-mentioned difficulties and a device according to the invention is characterized in that between a preferably cylindrical force-transmitting member and a surrounding, preferably rotary-symmetrical housing there are arranged three parallel, vacuum-tightly sealed and resilient mounting elements: one internal element facing towards the transducer space, one external element facing towards the outside and one intermediate element therebetween, the space between the external element and the intermediate element being connected to the transducer space, the space between the internal element and the intermediate element being connected to the atmospheric pressure and the area of the intermediate element being so much larger than the areas of the other two elements that equilibrium of forces is obtained independently of the difference between the pressure in the transducer space and the atmospheric pressure.

In other words, the diaphragm necessary for pressure compensation is located in an upper part of the load transducer, somewhat below the normal sealing diaphragm. In total three parallel diaphragms are used, which are vacuum-tightly attached between the force-transmitting member and the surrounding housing. An internal diaphragm is bounded by the transducer space, a preferably equally large external diaphragm is bounded by the atmospheric pressure, and an intermediate diaphragm is placed therebetween which is considerably larger than the other two diaphragms. The space between the external diaphragm and the intermediate diaphragm is connected to the transducer space and the space between the internal diaphragm and the intermediate diaphragm is connected to the atmospheric pressure. A difference between the pressure in the transducer space and the atmospheric pressure generates forces with the same direction from the internal diaphragm and the external diaphragm but with the opposite direction from the intermediate diaphragm, and with a suitable choice of area for the latter diaphragm, therefore, an equilibrium of forces can be obtained independently of the pressure variations.

If desired, one or more of the diaphragms can be replaced by stiff discs, attached at the force-transmitting member and sealing against the surrounding housing by means of bellows.

BRIEF DESCRIPTION OF DRAWINGS

The invention will now be described, by way of example, in greater detail with reference to the accompanying drawings, in which.

DESCRIPTION OF PREFERRED EMBODIMENTS

Figure 1:
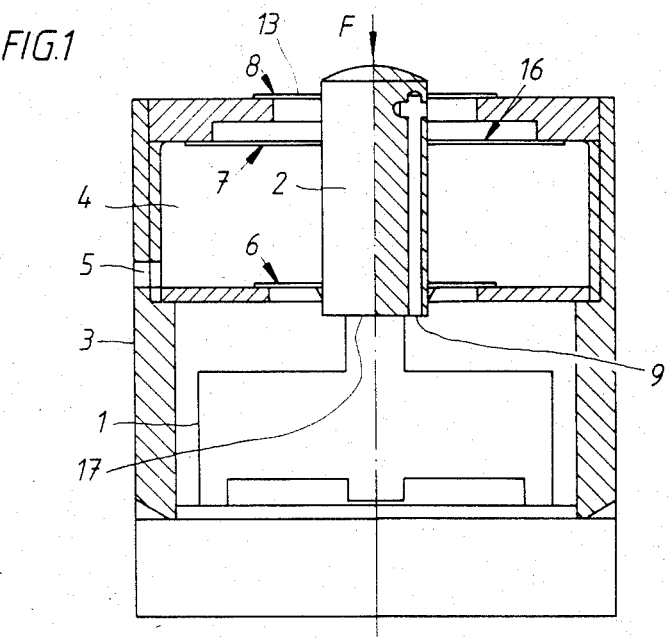
FIG. 1 is a sectional view of a load cell provided with a first embodiment of pressure change compensating unit according to the invention with compensating diaphragms.

FIG. 1 shows a load-measuring transducer, for example a load cell of the kind according to Swedish Pat. No. 151,267. The arrow F represents the force, load, or weight, etc. which is to be measured. This force F is transmitted, via a force-transmitting member 2, to the actual load-measuring transducer 1 of the cell. The member 2 is preferably cylindrical and contacts the transducer 1 over a surface 17.

The transducer 1 is surrounded by a transducer space in a gas-tight load cell housing 3. The pressure inside this space can vary due to temperature changes or for other reasons, and without some means for compensating for these pressure changes, they result in inaccuracies in the measurements made with the transducer 1.

To eliminate the effect of pressure differences on the measurement accuracy, the member 2 is contained within a cylindrical housing 4. Between the envelope surface of the pressure-transmitting member 2 and the surrounding cylindrical housing 4, three parallel diaphragms 6, 7, 8 are soldered or otherwise vacuum-tightly fixed. To transmit the force F to the transducer 1 with as small a loss as possible, the member 2 must be resiliently suspended to the housing 3 by means of the two outer resilient diaphragms, etc., 6 and 8. The task of these diaphragms is also to shut out the external environment and in certain cases they should also be able to take up lateral load.

The atmospheric pressure communicates via a channel 5 with the space within the housing 4 between the internal diaphragm 6 and the intermediate diaphragm 7.

The space within the housing 3 which contains the transducer 1 communicates via a channel 9 in the force-transmitting member 2 with the space between the external diaphragm 8 and the intermediate diaphragm 7.

Although the location of the channel 9 within the member 2 is convenient, it will be appreciated that this channel can be located anywhere and could be provided by separate ducting interlinking the two volumes in question.

The pressure difference between the external and the internal pressure affects the internal diaphragm 6 and the external diaphragm 8 in the same direction and with the same force when the diaphragms 6 and 8 are of equal size, and to this is added the force acting on the member 2 caused by the pressure difference. The pressure difference however, affects the compensating intermediate diaphragm 7 with a force in the opposite direction, and if this diaphragm is given an effective area which corresponds to the sum of the transverse area of the member 2 and the effective areas of the diaphragms 6 and 8, complete cancellation of forces resulting from pressure variations is obtained.

Figure 2:
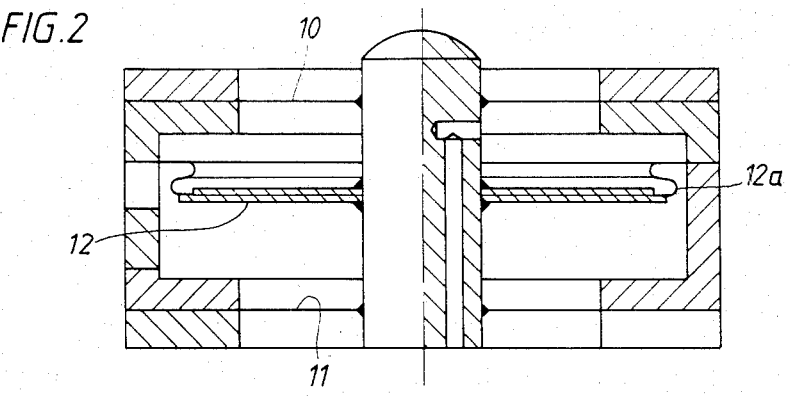
FIG. 2 is a sectional view of a second embodiment of pressure change compensating unit with a disc provided with bellows, and two diaphragms.
Figure 3:
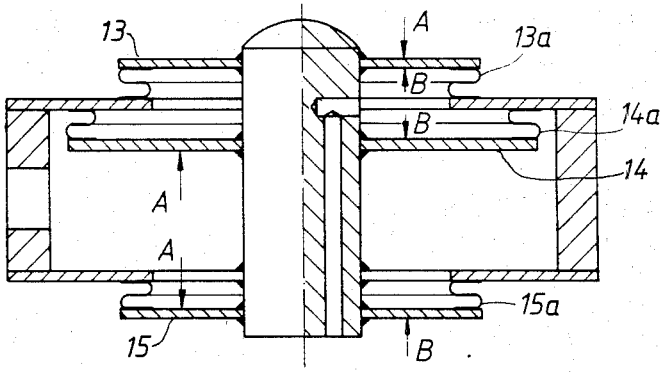
FIG. 3 is a sectional view of a third embodiment of pressure change compensating unit provided with three bellows-mounted discs.

FIG. 1 shows the pressure change compensating unit formed integrally with the transducer unit and this may be convenient. However, it is also possible to provide a separate unit for the pressure change compensation which can be used as an add-on unit with a conventional load cell. FIGS. 2 and 3 show two possible pressure change conpensating units which may, or may not be incorporated as a supplied component with a load cell.

One advantage of making the pressure change compensating unit separate from the transducer unit is that it is then possible to trim and check the functioning of the unit before it is built into a load cell housing 3.

The device shown in FIG. 1 can absorb a certain lateral load, which also applies to the device shown in FIG. 2. However, the embodiment shown in FIG. 3 is not able to take up a lateral load.

In the embodiment shown in FIG. 2, flexible diaphragms of equal effective area are provided at 10 and 11 and a stiff disc 12 of larger effective area, sealed to an annular bellows 12a is provided to generate the required pressure change compensating force. The mode of operation of the unit shown in FIG. 2 will, in principle, be the same as that discussed for the unit of FIG. 1.

In the embodiment of unit shown in FIG. 3 all the diaphragms are formed from stiff discs 13, 14, 15, each provided with a respective annular bellows 13a, 14a, 15a. By suitable dimensioning of these discs, it will be appreciated that the effect of ambient pressure changes can be made to sum to zero thus making the force applied to the force-transmitting member independent of such changes.

The devices illustrated and described above can be varied in many ways within the scope of the following claims.

What is claimed is:

1. A device in a hermetically sealed load cell for eliminating the effect on the load to be measured of a difference between the pressure in the hermetically sealed transducer space and the atmospheric pressure which comprises:
   a transducer, means defining a sealed space in which the transducer is located,
   a force-transmitting member for passing the load force to the transducer,
   a housing surrounding the force-transmitting member,
   three parallel elements, vacuum-tightly sealed to said force-transmitting member to resiliently suspend the same within the housing, of which one is an internal element confronting the transducer space, another is an external element subjected to atmospheric pressure, and the last is an intermediate element placed therebetween,
   the space between the external element and the intermediate element being connected to the transducer space, and the space between the internal element and the intermediate element being connected to atmospheric pressure,
   the area of the intermediate element being so much larger than the areas of the two other elements that equilibrium of forces is obtained independently of the difference between the pressure in the transducer space and the atmospheric pressure.

2. A device according to claim 1, in which the said three elements consist of diaphragms.

3. A device according to claim 1, in which said three elements consist of stiff discs secured to the force-transmitting member and sealed to the surrounding housing by means of bellows.

4. A device according to claim 1, in which the force-transmitting member is cylindrical and is disposed within said housing.

5. A device according to claim 1, in which the effective area of the internal and external elements are the same.

6. A load cell comprising:
   a force-sensing transducer,
   a first housing means containing said transducer,
   a force-transmitting member projecting into the first housing means and contacting the transducer therein,
   a second housing means surrounding the force-transmitting member,
   first, second and third diaphragm means each sealed in vaccum-tight manner to the force-transmitting member and to the housing means to support the former within the latter,
   the first diaphragm means acting to hermetically seal the transducer in a volume in the first housing means,
   the second and third diaphragm means defining therebetween a hermetically sealed volume and the first and second diaphragm means providing seals for the second housing means,
   a first duct means providing communication between the hermetically sealed volumes in the first housing means and between the second and third diaphragms, and
   a second duct means to permit the pressure within the second housing means to be atmospheric pressure at all times,
   the effective areas of the diaphragm means being such that any difference in pressure between that existing within the first and within the second housing means will generate forces on the diaphragm means which cancel each other out.

7. A pressure-change compensating unit comprising:
   a force-transmitting member located within and resiliently supported from a surrounding housing characterized in that
   the force-transmitting member is sealed in vacuum-tight manner to three spaced-apart diaphragm means, the perimeter of each of which diaphragm means is sealed in vacuum-tight manner to the housing,
   in that a volume is defined in the housing between one outer and the intermediate diaphragm means, which volume communicates, by a duct means formed in the force-transmitting member, with the end of said force-transmitting member closest to said other outer diaphragm means,
   in that the housing is provided with an opening to ensure that the inwardly facing surfaces of the other outer and intermediate diaphragm means are subjected to atmospheric pressure,
   and in that the area of the intermediate diaphragm means is larger than the area of either of the outer diaphragm means.

* * * * *